United States Patent [19]

Heard et al.

[11] Patent Number: 4,689,768
[45] Date of Patent: Aug. 25, 1987

[54] SPELLING VERIFICATION SYSTEM WITH IMMEDIATE OPERATOR ALERTS TO NON-MATCHES BETWEEN INPUTTED WORDS AND WORDS STORED IN PLURAL DICTIONARY MEMORIES

[75] Inventors: Roderick S. Heard; Joseph C. Tremoulet, both of Lexington, Ky.

[73] Assignee: International Business Machines Corporation, Armonk, N.Y.

[21] Appl. No.: 820,905

[22] Filed: Jan. 16, 1986

Related U.S. Application Data

[63] Continuation of Ser. No. 734,930, May 16, 1985, abandoned, which is a continuation of Ser. No. 393,836, Jun. 30, 1982, abandoned.

[51] Int. Cl.[4] ............................................... G06F 3/02
[52] U.S. Cl. ..................................... 364/900; 400/61; 400/63
[58] Field of Search ... 364/200 MS File, 900 MS File, 364/300, 419; 400/61, 63, 3, 74, 704

[56] References Cited

U.S. PATENT DOCUMENTS

| | | | |
|---|---|---|---|
| 4,092,729 | 5/1978 | Rosenbaum | 364/900 |
| 4,136,395 | 1/1979 | Kolpek et al. | 364/518 |
| 4,250,560 | 2/1981 | Dethloff et al. | 364/900 |
| 4,335,275 | 6/1982 | Brantingham | 381/51 |
| 4,355,371 | 10/1982 | Convis | 364/900 |
| 4,383,307 | 5/1983 | Gibson, III | 364/900 |
| 4,456,969 | 6/1984 | Herzik et al. | 364/900 |
| 4,495,566 | 1/1985 | Dickinson et al. | 364/200 |
| 4,498,148 | 2/1985 | Glickman | 364/900 |
| 4,503,514 | 3/1985 | Urquhart | 364/900 |
| 4,580,241 | 4/1986 | Kucera | 364/900 |
| 4,590,560 | 5/1986 | Sado | 364/419 |

FOREIGN PATENT DOCUMENTS 1572709 7/1980 United Kingdom.

OTHER PUBLICATIONS

P. Lemmons, *Five Spelling-Correction Programs for CP/M-Based Systems*, Byte Magazine (Nov. 1981) pp. 434-448.

R. A. Herbert et al, Automatic Spelling Verification Method with False Alarm Suppression, IBM Tech. Disclos. Bull. (vol. 22, No. 5, Oct. 1979), p. 1783.

T. L. Adams et al, Spelling Processing Functions Operator Interface, IBM Tech. Discl. Bull., (vol. 24, No. 10, Mar. 1982), pp. 5003-5008.

D. A. Hamilton et al, Document Supplement for Spelling Verification, IBM Tech. Discl. Bull., (vol. 23, No. 10, Mar. 1981), p. 4818.

H. W. Tuffill et al, Processing Text Files Using a Dictionary, IBM Tech. Disclos. Bull., (vol. 23, No. 8, Jan. 1981), pp. 3897-3898.

*Primary Examiner*—Archie E. Williams, Jr.
*Attorney, Agent, or Firm*—Laurence R. Letson

[57] ABSTRACT

Spelling errors are detected through the comparison of the keyed word with previously stored words of known spelling. The operator is immediately alerted upon the detection of a lack of comparison between the keyed word and the words available in the storage for operator consideration. When the operator is notified through an alerting device of a "no match", the operator may then modify the spelling of the word if it is incorrect or accept the word if it is correct but not found in the dictionary storage. Words previously not located in the dictionary storage are then stored in a random access memory for subsequent use and the word most recently verified as correct and stored in the random access memory may be maintained at the top of a stack while the most infrequently used words will eventually be removed from the random access memory as the memory fills and overflows.

22 Claims, 6 Drawing Figures

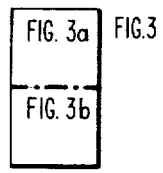
FIG. 3a
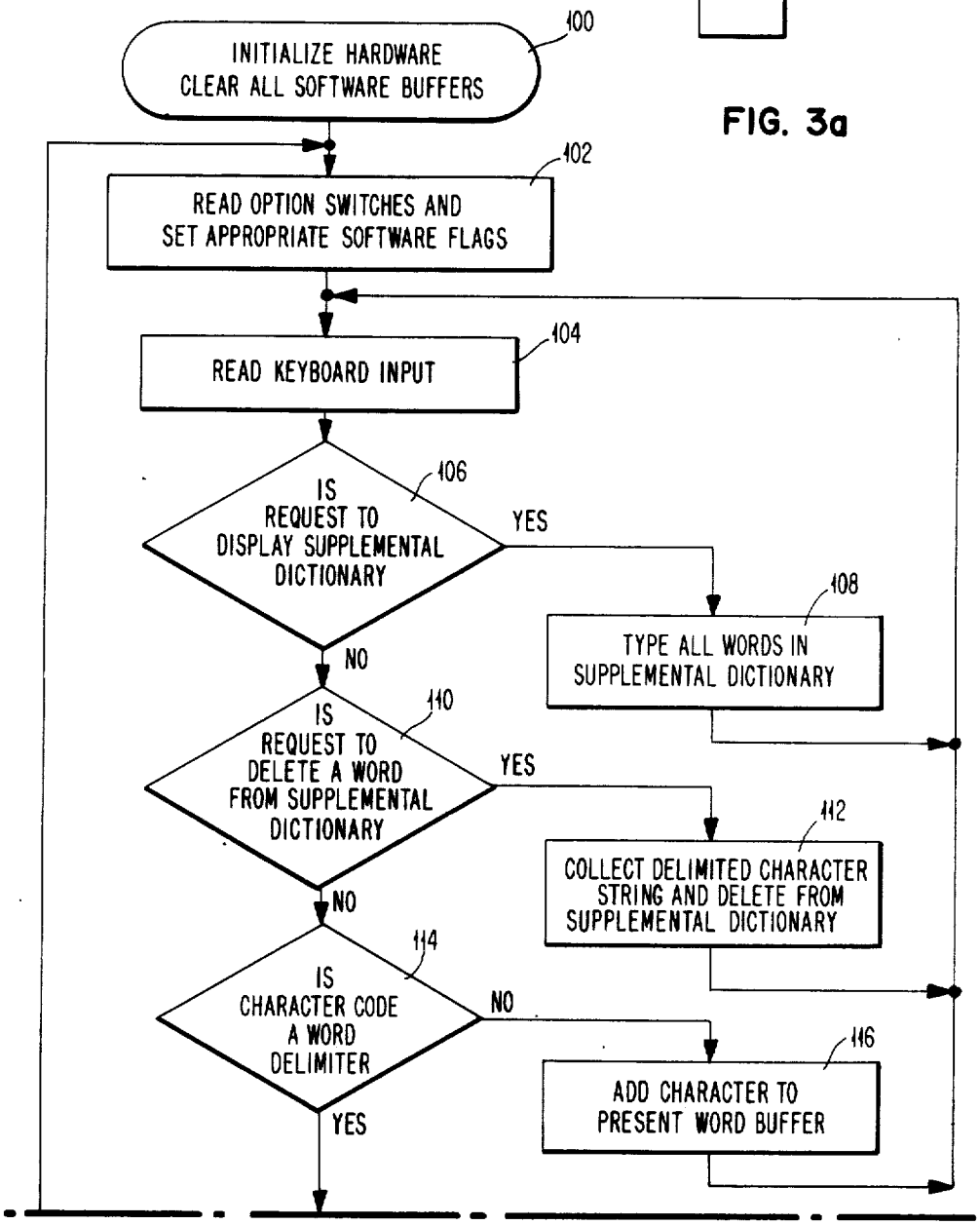

SPELLING VERIFICATION SYSTEM WITH IMMEDIATE OPERATOR ALERTS TO NON-MATCHES BETWEEN INPUTTED WORDS AND WORDS STORED IN PLURAL DICTIONARY MEMORIES

This application is a continuation of application Ser. No. 734,930, filed May 16, 1985, by Roderick S. Heard et al, titled Spelling Verification Method for a Typewriter and Typewriter Embodying Said Method, now abandoned, which is a continuation of application Ser. No. 393,836, filed June 30, 1982, by Roderick S. Heard et al, titled Spelling Verification Method for a Typewriter and Typewriter Embodying Said Method, now abandoned.

CROSS REFERENCES TO RELATED PATENTS AND APPLICATIONS

Applications having related subject matter include:
U.S. Pat. No. 3,995,254 to Walter S. Rosenbaum, filed July 16, 1975, issued Nov. 30, 1976, entitled "Digital Reference Matrix For Word Verification".
U.S. Pat. No. 4,342,085, filed Jan. 8, 1979, issued July 27, 1982, Glickman, et al, entitled "Stem Processing For Data Reduction In A Dictionary Storage File".
U.S. Pat. No. 4,503,514, filed Dec. 29, 1981, issued Mar. 5, 1985, Robert Urquhart, entitled "Compact High Speed Array For Dictionary Storage And Lookup".
The above applications and patents are commonly assigned with this application.
U.S. Pat. No. 4,136,395 to Robert A. Kolpek, et al, filed Dec. 28, 1976, issued Jan. 23, 1979, entitled "System For Automatically Proofreading A Document".

BACKGROUND OF THE INVENTION

With the increased use of word processing and electronic typewriting, the age old problem of detecting and correcting typographical or spelling errors in text being keyed into the word processing or typing devices can be more efficiently handled with the increased capability of electronics. The correcting of spelling errors necessitates delays, retyping and corrections and hinders timely completion of typing and word processing work.

Spelling verification features, programs and capabilities or systems known as dictionaries for spelling verification are available on computer systems which are typically used in a word processing environment and on dedicated word processing systems. The number of words stored in a particular data base or dictionary vary in size with the design of the particular system. In many cases, the vocabulary or the dictionary contents are fixed by the provider of the system or the program while, in some cases, the operator may supplement the system with designated words of a particular importance to that operator.

For example, a medical typist would have need for medically related terms in the dictionary while an engineer or scientist would use technical terms of a different nature and would find medical terms of no use.

Words of highly repetitive use or of a particularly troublesome nature can be selectively stored by the operator as part of the spelling verification systems used on word processing devices.

The prior art systems compare the word typed and stored in the memory with the words of the dictionary or the vocabulary to determine whether a compare exists in the dictionary. This comparison is typically performed on each and every word in the document after the document has been completely typed and the spelling verification routine has either been accessed or loaded into the word processing system and the spelling verification routine commanded. The comparison continues until the document has been completely compared on a word for word basis and then the words of questionable spelling are displayed or highlighted. Any word which cannot be verified by a comparison in the dictionary is indicated as a questionable spelling though highlighting or underscoring or other visual attention securing technique to allow the operator to determine whether the word is properly or improperly stored. After the operator has had the opportunity to review the questionable spellings, the operator may indicate that a word is properly spelled and no further action will be taken or the operator may indicate by rekeying that a word is improperly spelled at which point correction will occur and the comparison may, if desired, be accomplished again.

The technique in general described above is available on personal computers which are capable of being programmed to handle word processing tasks and which are provided with programs which perform the spelling verification checks on documents stored in the storage of the personal computer. In addition, word processing systems such as the IBM Displaywriter manufactured and sold by the IBM Corporation has available a spelling verification feature which compares the words stored in the text memory of the IBM Displaywriter with a fixed vocabulary in excess of 50,000 words.

Additional unique operator selected words may be stored for comparison if desired.

Typewriters by their very nature of printing the document as the keys are depressed by the operator do not provide an opportunity to review the entire document and to, through highlighting or other visual indication, indicate potentially misspelled words for the operator. Typewriters also don't have loading capability for loading supplemental dictionary and thus fixed dictionaries would be the only dictionary available on a traditional typewriter without magnetic media.

OBJECTS OF THE INVENTION

It is an object of the invention to provide for spelling verification on a typewriter.

It is another object of the invention to update the stored vocabulary in the dictionary in a variable storage as the operator keyboards the input to the typewriter.

It is another object of the invention to retain in the most easily accessible portion and most rapidly accessed segment of the operator controllable dictionary memory the most repetitively used words.

It is still another object of the invention to provide an interactive concurrent feedback to the operator indicating a non-match condition so that the operator may consider correcting the word while still on the same typing line or within a reasonably easily accessible displacement from the word being verified.

SUMMARY OF THE INVENTION

As words are keyboarded into a typewriter having an electronic processor for spelling verification and an electronic keyboard portion of a typewriter and a space bar code or other word ending indication is generated through a space bar or punctuation key or some other designated key being depressed, the compare operation then proceeds with respect to the immediately foregoing word. With two segments of memory available for the storage of words for spelling verification purposes, it is possible to have one provided with a fixed predefined vocabulary and one memory capable of receiving variable information as inputted from the keyboard. As the compare operation proceeds, it will search the fixed portion of the memory and if no word of the same spelling is found stored therein, then the variable portion of the vocabulary will be searched.

If a match in either segment of the memory is found, then the spelling of the word has been verified and the processor in control of the typewriter will cause no other externally detectable effects. However, internally the word, if found in the variable portion of the vocabulary, may be deleted from the variable memory and restored therein such that it will then reside at the top of the stack as the most recently utilized and verified word. Alternatively, a word found in the variable portion of the vocabulary may be moved only part way toward the beginning of the file memory and thus not congest the beginning of the file with highly specialized words. Also, initial insertion of new words may be other than at the top of the file.

If a no match condition exists with respect to the last complete word keyboarded by the operator, an alerting signal such as a light, buzzer or bell is activated to indicate to the operator that the spelling of the preceding word is at least questionable. If the operator detects upon review of the word that an error exists, the operator may then proceed to correct the error prior to further typing. If the operator corrects the word, the word is then recompared with the vocabulary upon the depression of the space bar or other word delimiter. If the spelling is now accepted by the operator as correct, the correctly spelled word is inserted into the variable portion of the vocabulary if it does not reside in the fixed portion.

If the operator detects that no error of spelling exists but rather a situation where the word keyed is not found in either of the portions of the vocabulary memory, the operator will continue to type accepting the spelling on the page. When the next word ending occurs, the preceding word having been considered will then be considered as a valid spelling and will be stored in the variable portion of the vocabulary storage. If the variable portion of the vocabulary storage is full and no further available space can be found, the word may be stored and the word which has resided in the variable portion of the memory and not been used in a spelling verification for the longest period of time may be deleted from the memory.

An alternative embodiment would cause an indicator to signal dictionary full and the word would not be stored.

DRAWING

FIGS. 3a and 3b are the flow diagrams illustrating the functional sequence that occurs as keyboarded characters are provided from the keyboard to the spelling verification processor and the printer processor.

DETAILED DESCRIPTION OF THE INVENTION

Figure 1:
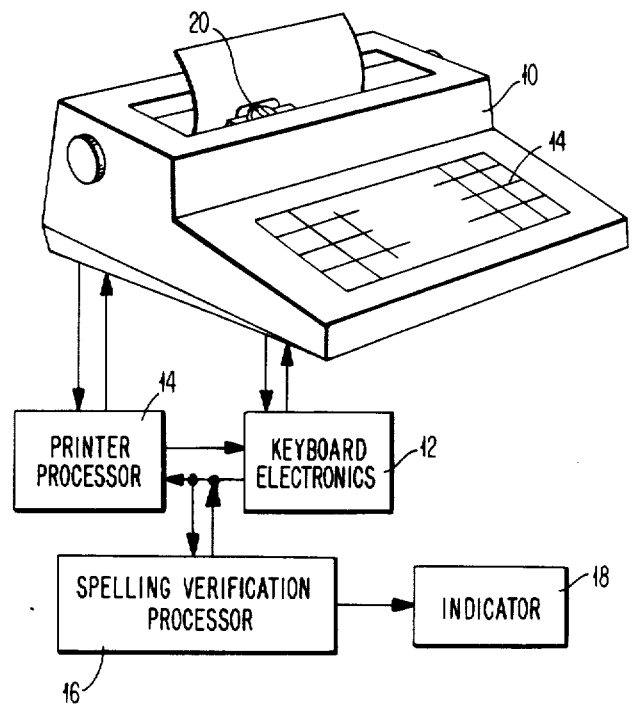
FIG. 1 illustrates a typewriter having a processor for controlling the printing functions and character selection as well as a keyboard processor and a separate spelling verification processor for handling the spelling verification chores.

This invention is implemented in an electronic typewriter 10 which has electronically associated with it a keyboard electronics with a channel of communication between the keyboard 14 and the keyboard electronics 12. Keyboard electronics 12 will provide output signals and may receive feedback signals from the printer processor 15. Tapped into the lines interconnecting keyboard electronics 12 and the printer processor 15 is a connection to the spelling verification processor 16. Spelling verification processor 16 also provides a command line to the indicator panel 18. Printer processor 15 provides a two-way communication path between the processor 15 and the printer portion 20 of the typewriter 10.

The connection of the spelling verification processor 16 may be moved with only minor modification to a point between the printer processor 15 and the typewriter 10. The changes would involve the coded data available to the spelling verification processor 16 in that the printer processor 15 outputs signals representing characters in a different form from the keyboard processor output signals. These connections only need to intercept the data flow at any point between the keyboard 14 and printer 20.

Figure 2:
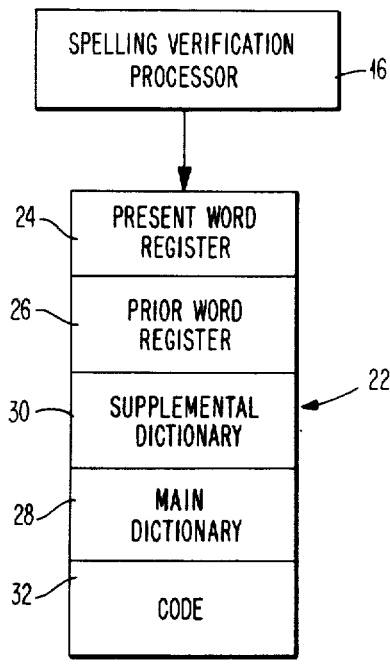
FIG. 2 is a representation of the spelling verification processor together with the associated memory available to it which includes within that memory the present word register, prior word register, main and supplemental dictionaries and operational code.

Referring to FIG. 2, the spelling verification processor 16 has associated with it a memory 22. The memory 22 is divided into several segments. The segments which are directly related to the spelling verification capability include the present word register 24, the prior word register 26, the main dictionary 28, supplemental dictionary 30 and the code segment 32. The present word register 24 is the register in which letters and character codes are accumulated as keyboarded by the operator on the keyboard 14 and processed by the keyboard processor 12. The prior word register 26 contains the delimited character string defined as the prior word and is a temporary storage location.

The main dictionary 28 is a segment of memory 22 which is loaded with the code representing approximately 50,000 words. The vocabulary stored in the main dictionary 28 is stored in a fixed menner and, therefore, is not subject to change by operator action.

The supplemental dictionary 30 is a segment of memory 22 available for the temporary and operator-controlled storage of words which are not found in the main dictionary 28.

Code section 32 is the portion of the memory 22 dedicated to the storage of the operational codes and required data storage area, such as, by way of example, those contained in Appendix A which control the function of the spelling verification processor and the movement of information and data into and out of the other memory sections as well as the operation of the indicators on the indicator panel 18.

Referring to FIG. 3, the flow diagram illustrates the operation of the spelling verification feature on an electronic typewriter. The other features and operations of the electronic typewriter are not illustrated inasmuch as they are not part of this invention and they only provide a basis upon which the spelling verification feature is added to improve the typewriter.

DESCRIPTION OF THE INVENTION

With the initiating of machine operation in the conventional manner by turning on typewriter 10, the spelling verification processor 16 will initialize with a standard power on reset sequence and, at the same time, will clear all of the registers or software buffers in the processor which may contain flags or indicators from a previous machine operation (block 100).

After the initialization routine (block 100), the spelling verification processor 16 will then determine by checking the different switches to determine which of the options have been selected by the operator.

The operator may turn the spelling verification feature on or off and assuming that the operator elects to have the feature on, may elect further to automatically update the supplementary dictionary 30 or the operator may update the supplemental dictionary 30 on a word-by-word selective basis. Further, the operator may delete words from the supplemental dictionary 30 should it be desirable to remove a word which may have inadvertently been placed in the supplemental dictionary 30 and proven later to be erroneously spelled. Additionally, the operator may command that all words in the supplemental dictionary be printed.

Upon the completion of the reading of the option switches which may take the form of physical switches or may take the form of electronic commands which have been keyed into the keyboard such as the depression of the code key plus a character key, the routine flows from block 102 to the read keyboard input routine in block 104. In the read keyboard input routine in block 104, the keyboard output is converted to a code which may be used by the spelling verification processor 16 for its purposes.

Upon the completion of the read keyboard input (block 104) and if the option of displaying or deleting from the supplemental dictionary 30 has been selected, the flow will be to block 106 where the decision is made as to whether the keyboard input is a request to display the contents of the supplemental dictionary 30. Otherwise, the flow is to block 114 as described below. In the event that the request is to display the contents, then the "YES" branch flows to block 108 and initiates a typing action to type out on display all words contained in the supplemental dictionary and the flow then branches back to above block 104.

If the keyboard input is not a request to display the contents of supplemental dictionary 30, the flow through the "NO" path will be to block 110 where a decision will be made as to whether the request is to delete a word from the supplemental dictionary 30. If the request is to delete a word from the supplemental dictionary 30, the flow will be to the routine in block 112 where a fully delimited character string is collected and the deletion of that identical character string from the supplemental dictionary is accomplished. Thereupon, the flow will return to block 104 for further reading of the keyboard inputs.

If the last decision regarding whether the keyboard input is a request to delete a word from the supplemental dictionary 30 (block 110) is in fact no, then the decision is made in block 114 as to whether the character is a word delimiter which would then define the end of a complete word. If the character is not in the set of codes designated as word delimiters, which by definition follow and precede a complete word, then that character is added to the present word buffer in block 116 and the flow returns to just prior to block 104 and further keyboard inputs are read.

If the keyboard input which is read in block 104 is not a request to either display the contents of supplemental dictionary 30 or to delete a word from the supplemental dictionary 30 as in blocks 106 or 110, respectively, and the character is a word delimiter, then the flow is directed to block 118 where a determination is made as to whether the non-match indicator is set from the previous word and is the automatic update option on or has the update request been typed by the operator.

If the non-match indicator for the previous word is set (block 118), this indicates that the previous word was not found in either the main or supplemental dictionaries 28, 30 and assuming one form or another of the update has been actuated, then the previous word is added to the supplemental dictionary 30 (block 120). If either the non-match indicator is not set indicating that a match was found for the previous word or the update options have not been activated or turned on, then the flow continues and the present word is compared with contents of the dictionaries in a two-step search where the supplemental dictionary 30 of specially added words is searched and then the main dictionary 28 of the most commonly used words is searched. This occurs in blocks 122 and 123. If the word is found in either dictionary 28, 30, then in accordance with the flow to block 124, there is an indication that the word matches. This may be accomplished in a multitude of ways, such as suppressing any alarms or turning off any word in error light which may have been previously illuminated for the preceding word.

If the word is not found in either the main dictionary or the supplemental dictionary (block 122), the "NO" path of the flow will lead to block 126 where a decision is made and a routine executed to indicate that the word failed to match any word in the two dictionaries 28, 30. At that time, the indicators are activated to indicate a non-match condition or word not found condition such as turning on a light or sounding an audible alarm. The form of the operator attention-getting alarm whether visual or audio is immaterial with respect to the implementation of the invention. The important part is that some attention-getting mechanism be activated to cause the operator to recognize the fact that the present word has not been found in the dictionary and needs operator verification for correct spelling.

The indicator 18 may also have an "error in line" light so that the operator is aware of an error if the next word is keyed and delimited before the word error is detected by the operator. In such case, it may be desirable to modify the routine to only update the supplemental dictionary with new words upon a carrier return command or line ending command.

In addition, in block 126 a flag or an indicator is set indicating that the word failed to match, and this indicator is then checked in decision block 118 upon the next pass through the flow. In this way, the contents of the word in the prior word buffer 26 at that time will be transmitted into and stored in the supplemental dictionary 30 if the operator has elected to either automatically update the supplemental dictionary 30 or has indicated by keyboard input that the word is to be used as an update on a selective basis for the supplemental dictionary 30.

Figure 4:
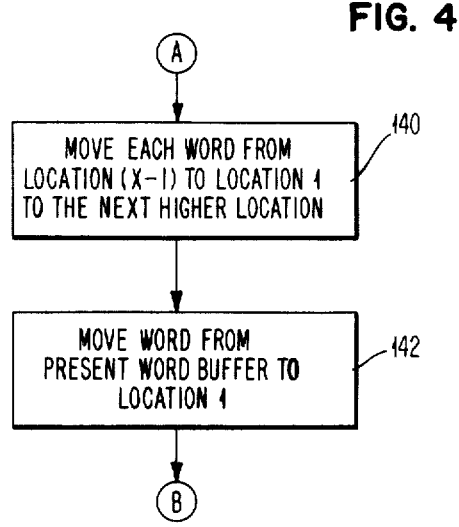
FIG. 4 illustrates the routine flow for cascading stored words downward in the memory and inserting the most recently compared word in the highest position in the memory if found in the supplemental dictionary.

Referring to FIG. 4, the routine illustrated therein allows a word which has been found in the supplemental dictionary to be maintained at or near the top of the supplemental dictionary while less frequently used words are shifted to the bottom and thus are available for automatic elimination from the supplemental dictionary. Other entry points may be used and the word may be moved toward other locations if desired.

Figure 3B:
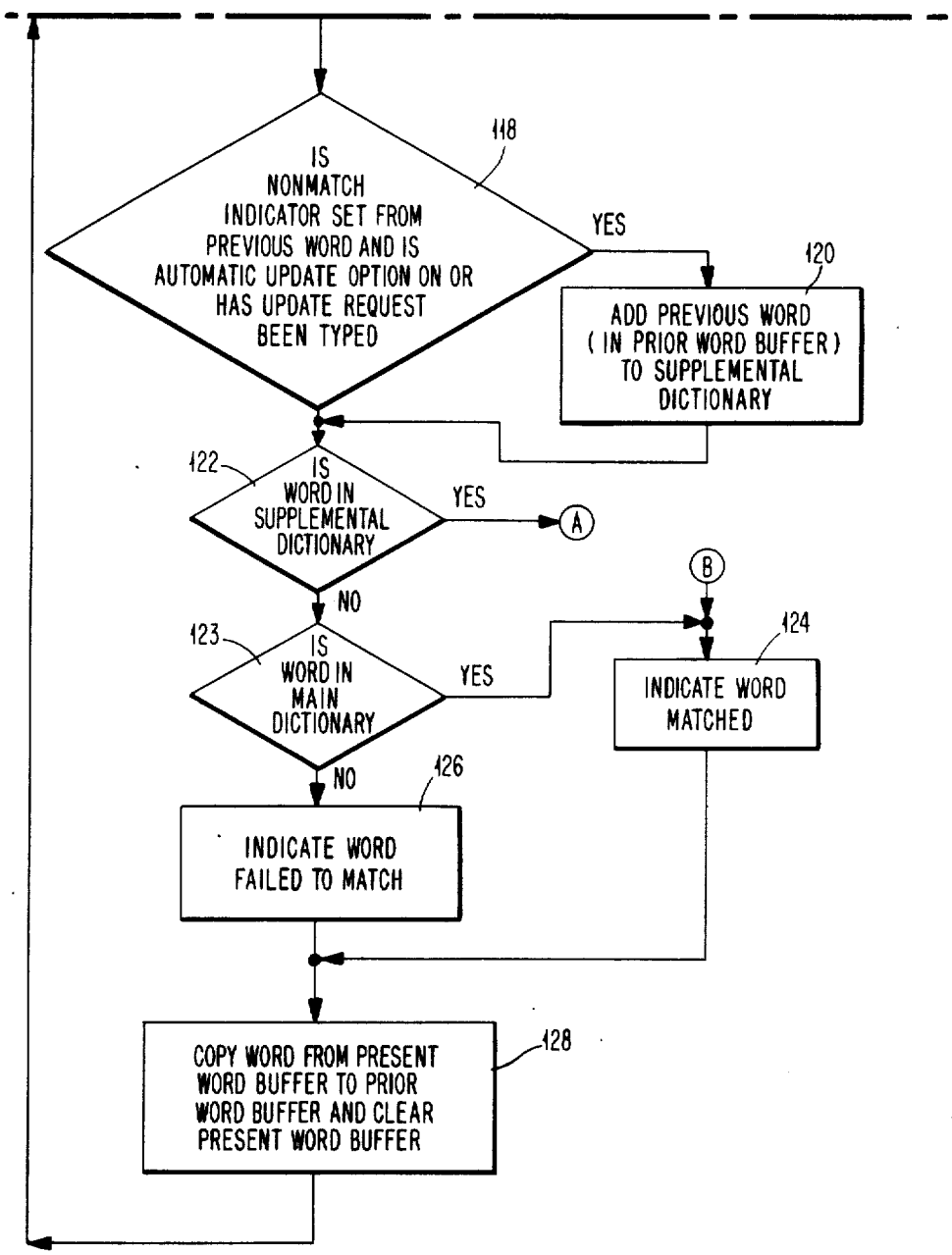

The routine illustrated in FIG. 4 is a result of branching from block 122 in FIG. 3b wherein the decision was made that the word was, in fact, found in the supplemental dictionary. Upon such a determination, the word location in the supplemental dictionary is determined and noted. If that location is designated as location X wherein X is between 1 and N, N being the largest number of word storage positions available in the memory, and 1 being the most recently stored word location, then the word stored in position $X-1$ is moved to location X and a similar shifting of each word above the $X-1$ position is accomplished to cascade the words in storage downward leaving the location 1 available. This procedure is illustrated in block 140.

Upon the completion of the cascading of the previously stored word downward, the word in the present word buffer is then stored in supplemental memory location 1 (block 142).

Thereupon, the flow returns to block 124 at point B as illustrated in FIG. 3b.

Figure 5:
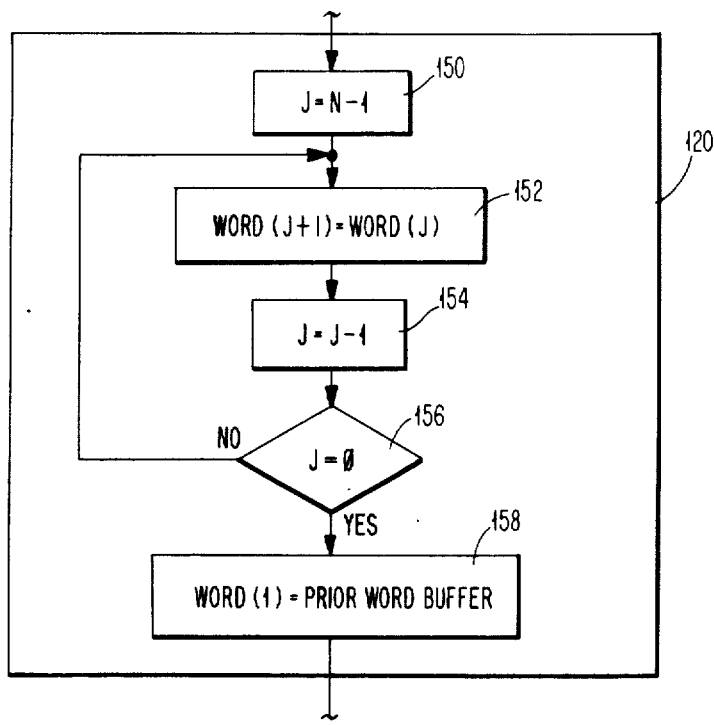
FIG. 5 is an expansion of the routine of block 120 in FIG. 3b.

FIG. 5 illustrates a further amplification of block 120, in order to add words to the supplemental dictionary when the supplemental dictionary is full, it is necessary to remove a word from the supplemental dictionary and to replace it with the new word. When adding a word to the supplemental dictionary, it is desirable to add it at the top of the stack and to cascade words previously stored in the supplemental dictionary down by one word storage location such that the least recently used word is removed from the supplemental dictionary 30 and eliminated entirely from the system when the supplemental dictionary is full.

In block 150, J, a temporary counter value is assigned to the word position $N-1$ where N is the maximum number of words contained in the supplemental register.

With the word in storage location $N-1$ now designated as word J, word J is now moved to word $J+1$ position in block 152. Thereupon, J is decremented by one in block 154 and the procedure repeated until all words have been cascaded downward by one storage position. At which point, then J will be equal to zero in bock 156 and the procedure branches such that the word in the prior word buffer is moved, in block 158, to word storage position 1 in the supplemental dictionary.

The routine in FIG. 4 when used with the routine in FIG. 5 has the effect of deleting the least frequently used word and storing the most recently used word on the top of the stack to insure maximum retention of frequently used words.

The techniques with which the characters and words, word stems, prefixes and suffixes are stored in the code and accessed by the spelling verification microprocessor are not key elements of this invention and have been substantially implemented in the IBM Displaywriter which is available for purchase from the IBM Corporation, Armonk, N.Y.

The IBM Displaywriter performs the functions and comparisons on a strictly batch processing basis after the entire document has been stored in memory and a separate spelling verification program loaded and operated with respect to that particular document.

The above-disclosed device is an improvement thereon which allows the implementation of spelling verification system in an interactive mode on a typewriter such that the operator gets immediate feedback and the opportunity to correct errors immediately without waiting until the entire document is completely typed.

It is impractical from a typewriter operator standpoint to wait for the entire document to be recorded inasmuch as some electronic typewriters have very limited text memory and, therefore, the text would not be available for playout after correction.

This system may be implemented by programming code using an Intel 8086 or Intel 8088 microprocessor. Both of the Intel 8086 and 8088 microprocessors are capable of handling the same code generally and, therefore, in that respect are interchangeable.

The implementation of this system will, of course, depend to a great extent upon what processor is selected by the implementer and it should not be considered that the Intel 8086/8088 microprocessors are the only microprocessors which would be useable in this implementation. By way of example only, important portions of the microprocessor code listing together with locations of storage, code, nmemonics, labels and comments are included in Appendix A and are appended hereto only by way of example. An implementer choosing to implement this system may quite simply utilize a different code listing or a different sequence of steps as may be advantageous under the circumstances. Those subroutines not included in the Appendix A may be coded by a skilled programmer based upon the flow diagrams in FIGS. 3a, 3b, 4 and 5.

Code listings for the general operation of the typewriter which are not a part of the invention are not attached.

Useable electronic typewriters are available on the market. For example, IBM Model 50, IBM Model 60 and IBM Model 75 Electronic Typewriters may be utilized together with a spelling verification processor to add this function thereto if so desired.

Should other typewriters be utilized, it will be necessary for the implementer to modify some of the techniques to accommodate the basic hardware or software features upon which the feature will be implemented.

APPENDIX A

```
LOC      OBJECT CODE      STMT SOURCE STATEMENT

2 *                           BEGINSEGMENT (SPELL MAIN)
                             3 *                           1. TEXT
                             4 *****************-START-OF-SPECIFICATIONS-*****************
                             5 *
                             6 * PROGRAM NAME: LSPMAIN                                   *
                             7 *
                             8 * DESCRIPTIVE NAME: SPELLING MODEL MAIN DRIVER            *
                             9 *
                            10 ******************-END-OF-SPECIFICATIONS-*****************
                            11 *                           1. ENDTEXT;
                            12 *                           1. DEFINE
                            13           JSCIPOOL          COMMON POOL MACRO
000000                      14 JSCIPOOL DSECT

16************* SPELL MAIN VARS *************
000000 00                   17+#LSBDUMM DC   X'00'          DO FOREVER DUMMY
                            18+#LIBSTSZ EQU  X'1000'        STACK SIZE (BYTES)
                            19+#LSACLRD EQU  *              CB FOR CLEARING DISPLAY (NULL ENTRY)
000001 0100                 20+          DC   X'0100'        "    "    "    "    "
000003 15                   21+#LSBPCOP DC   B'00010101'    PC OPTIONS SWITCH (-0=PC,0=MULTIBUS)
                            22+#LSMPCSW EQU  B'00000001'    PC MODE VS MULTIBUS MODE SWITCH
                            23+#LSMDCSU EQU  B'00000010'    BIT MASK FOR DATA COLL SUPL UPDATE IN PC
                            24+#LSMDCER EQU  B'00000100'    BIT MASK FOR DATA COLL BAD WORD IN PC
                            25+#LSMPCTW EQU  B'00001000'    BIT MASK FOR KEYBOARD SEL(1=PC,0=TYPEWRIT)
                            26+#LSMDCCK EQU  B'00010000'    BIT MASK FOR DATA COLL NUM OF SEQ GOOD WDS
000004                      27+#LSAORCS DS   A              ORIGINAL CS VALUE (=0 FOR PC ENVIRON)
                            28************* LIMITMB VARS *************
                            29+#LIACMPP EQU  X'A7'          PPI CONTROL PORT FOR PRINTER ON PI CARD
                            30+#LIMCPR1 EQU  X'A9'          MODE=01 A=?????????
                            31+#LIMCPR2 EQU  X'00'          MODE 01 RESET OF BIT C4   ?????????
                            32+#LIACNP1 EQU  X'B0'          PPI CONTROL PORT 1 FOR MULTIBUS ENVIRON
                            33+#LIAPCP1 EQU  X'243'         PPI CONTROL PORT 1 FOR PC EXTENSION
                            34+#LIMCNP1 EQU  X'99'          MODE=0 A=I B=0 C=I
                            35+#LIAPIT  EQU  X'D6'          PROG. INTERRUPT TIMER ADDRESS
                            36+#LIHPIT1 EQU  X'96'          SET TIMER 2,MODE 3,LSB ONLY,BINARY
                            37+#LIATMR2 EQU  X'D4'          TIMER 2 ADDRESS
                            38+#LINTMR2 EQU  X'08'          COUNT FOR TIMER 2 FOR 9600 BAUD RATE GEN
                            39+#LIASERC EQU  X'DA'          SERIAL (USART) CONTROL PORT ADDRESS
                            40+#LIASERS EQU  X'DE'          SERIAL (USART) STATUS PORT ADDRESS
                            41+#LIASERD EQU  X'D8'          SERIAL (USART) DATA PORT ADDRESS
                            42+#LIHSER1 EQU  X'4E'          ASYCH,1 STOP BIT,PARITY OFF,16X RATE
                            43+#LIHSER2 EQU  X'37'          INIT RTS,ERROR RESET,REC ENABLE,DTR
                            44+#LIAKBRD EQU  X'B8'          KEYBOARD INPUT PORT (3A-MULTIBUS)
                            45+#LIAPKBR EQU  X'240'         KEYBOARD INPUT PORT (3A-PC)
                            46+#LIAERR  EQU  X'B9'          ERROR OUTPUT PORT (3B-MULTIBUS)
                            47+#LIAPERR EQU  X'241'         ERROR OUTPUT PORT (3B-PC)
                            48+#LIAOPT  EQU  X'BA'          OPTIONS INPUT PORT (3C-MULTIBUS)
                            49+#LIAPOPT EQU  X'242'         OPTIONS INPUT PORT (3C-PC)
000006 00                   50+#LIBERR  DC   X'00'          BYTE TO HOLD STATUS OF ERROR PORT
000007 00                   51+#LIBOPT  DC   X'00'          BYTE TO HOLD STATUS OF OPTIONS PORT
                            52+#LIMCLRI EQU  B'11111000'    BIT MASK TO CLEAR LED INDICATORS
                            53+#LIMINMN EQU  B'00000001'    BIT MASK TO TURN ON IN MAIN DICT LED
                            54+#LIMINSU EQU  B'00000010'    BIT MASK TO TURN ON IN SUPP DICT LED
                            55+#LIMNOTF EQU  B'00000100'    BIT MASK TO TURN ON NOT FOUND LED
                            56+#LIMLINE EQU  B'00001000'    BIT MASK TO " ON NOT FND IN THIS LINE LED

57+#LIMSUPF EQU  B'00010000'    BIT MASK TO TURN ON SUPPLEMENTAL FULL LED
                            58+#LIMSTRB EQU  B'01000000'    BIT MASK TO STROBE SHIFT REG WHEN OUTPUT
                            59+#LIMLCK  EQU  B'10000000'    BIT MASK TO LOCK UP THE KEYBOARD
                            60+#LIMPROP EQU  B'10000000'    BIT MASK - POR OILY OPTIONS(1=POR ACTIVE)
                            61+#LIMPRON EQU  B'01111111'    COMPLEMENT OF ABOVE
                            62+#LIMUPSU EQU  B'00000001'    OPTION BIT MASK - REQUEST SUPPL UPDATE
                            63+#LIMPRNT EQU  B'00000010'    OPTION BIT MASK - PRINT SUPL UPDATE WORD
                            64+#LIMDISP EQU  B'00000100'    OPTION BIT MASK - DISPLAY ERROR WORD
                            65+#LIMRLCK EQU  B'00001000'    OPTION BIT MASK - LOCKUP KEYBOARD
                            66+#LIMCJUS EQU  B'10000000'    OPTION BIT MASK - CODE J UPDATE SUPL
                            67************* PC FILE CONTROL BLOCK *************
                            68+#LPAFCB  EQU  *-JSCIPOOL
000008 02                   69+#LPBDRIV DC   X'02'          DRIVE NUMBER (DEF=2)
000009 5445404502020202     70+#LPCFNAM DC   S'TEMP   '     FILENAME (DEF=TEMP)
000011 4F5554               71+#LPCFEXT DC   S'OUT'         FILENAME EXTENSION (DEF=OUT)
000014                      72+#LPKBLOC DS   2X             CURRENT BLOCK NUMBER (0-255)
000016                      73+#LPFRECS DS   2X             RECORD SIZE
000018                      74+#LPWFSLO DS   2X             FILE SIZE (LOW PART)
00001A                      75+#LPWFSHI DS   2X             FILE SIZE (HIGH PART)
00001C                      76+#LPHDATE DS   2X             DATE
00001E                      77+#LPIRESV DS   10X            RESERVED AREA
000028                      78+#LPDRELR DS   X              RELATIVE RECORD NUMBER
000029                      79+#LPHRRLO DS   2X             RANDOM RECORD NUMBER (LOW PART)
00002B                      80+#LPHRRHI DS   2X             RANDOM RECORD NUMBER (HIGH PART)
                            81************* GETCHAR VARS *************
00002D 0000                 82+#LGHTIME DC   X'0000'        TIMER FLAG (0 = NOT TIMING)
                            83+#LGNCODZ EQU  X'84'          CODE Z BAIL CODE FOR LOCKUP KEYBOARD
                            84************* BUFFH VARS *************
00002F                      85+#LEBPADL DS   X              PAD LIMIT FOR PADDING BLANKS (X'20')
                            86************* FNDWRD VARS *************
                            87+#LFBCCNT EQU  #LFTCBUF       BUFFER CHARACTER COUNT
                            88+#LFHWDLM EQU  X'40'          WORD DELIMITER FLAG MASK
                            89+#LFHNUM  EQU  X'20'          NUMERIC KEY FLAG MASK
                            90+#LFHCRTN EQU  X'10'          CARRIER RETURN FLAG MASK
                            91+#LFHSHFT EQU  X'30'          SHIFT KEY(U->L OR L->U) FLAG MASK
000030 00                   92+#LFBRETC DC   X'00'          RETURN CODE FOR FNDWRD
```

```
                          93+=LFNUPCA EQU   X'01'          UPPER CASE VALID ALPHA FLAG                              00009400
                          94+************** COPYA VARS     *****DATA COLLECTION RECORD ***********                  00009500
                          95+=LCHTLEN EQU   40             LENGTH OF BUFFER                                         00009600
                          96+=LCAPORD EQU   *-JSCIPOOL     ADDR OF PRINT OR DISPLAY AREA(REL TO 0080)                00009700
000031 01                 97+=LCBSPAC DC    X'01'          NUMBER OF LINESPACES DESIRED @ PRINTER                    00009800
                          98+=LCAASCI EQU   *-JSCIPOOL     ADDR OF ASCII BUFFER(RELATIVE TO DS=0080)                 00009900
000032 28                 99+=LCBTLEN DC    AL1(=LCHTLEN)  NUMBER OF CHARACTERS IN BUFFER                            00010000
000033                   100+=LCTASCI DS    (=LCHTLEN)X    BUFFER FOR ASCII DATA COLLECTION                         00010100
                         101+************** DATA COLLECTION CODE EQUATES ***************                            00010200
                         102+=LDMSUPU EQU   X'01'          SUPPLEMENTAL UPDATE                                       00010300
                         103+=LDMBADW EQU   X'02'          BAD WORD (ERROR)                                          00010400
                         104+=LDMOKCT EQU   S'30'          NUMBER OF SEQUENTIAL GOOD WORDS                           00010500
000058 00                105+=LDBOKCT DC    X'00'          BYTE TO ACCUMULATE # OF SEQ GOOD WORDS                    00010600
                         106+*****************************************************                                   00010700
                         107+=LFACBUF EQU   *-JSCIPOOL     ADDRESS OF BUFFER(RELATIVE TO DS=0080)                    00010800
00005C                   108+=LFTCBUF DS    64X            BUFFER FOR CHARACTERS                                    00010900
00009C 0000              109+=LFWICOD DC    X'0000'        PRESENT CHARACTER INPUT(INTERNAL CODE)                    00011000
                         110+        PRINT OFF                                                                       00011100
                         678+        PRINT ON                                                                        00011200
                         680 *                             1. ENDDEFINE;                                             00011300
                         681 *                             1. DECLARE                                                00011400
                         682         EXTRN LINITMB                                                                   00011500
                         683         EXTRN LFNDWRD                                                                   00011600
                         684         EXTRN LERROR                                                                    00011700
                         685         EXTRN LJSPCNTL                                                                  00011800
                         686         EXTRN JSSWDADD                                                                  00011900
                         687         EXTRN LSAPOOL                                                                   00012000
                         688         EXTRN LSASTCK                                                                   00012100
                         689         EXTRN JDLDA                                                                     00012200
                         690         EXTRN JDLSA                                                                     00012300
                         691         EXTRN LCOPYA                                                                    00012400
                         692         EXTRN LPRINT                                                                    00012500
                         693         EXTRN LBUFFW                                                                    00012600
                         694         EXTRN LDISPLAY                                                                  00012700
                         695 *                             1. ENDDECLARE;                                            00012800
                         696 *                             1. ENTER MAIN;                                            00012900
000000                   697 LSPMAIN CSECT                                                                           00013000
                         698         USING LSPMAIN,,CS                                                               00013100
                         699         USING JSCIPOOL,,DS                                                              00013200
000000                   700         ORG   *+X'800'                                                                  00013300
                         701         ENTRY LSTART                                                                    00013400
                         702 LSTART  EQU   *                                                                         00013500
                         703 *                             1. ADJUST (4 BIT) STACK ADDRESS SO THAT;                  00013600
                         704 *                             1. YOU CAN NOW;                                           00013700
000800 8CCB              705         L     BX,CS                                                                     00013800
000802 B104              706         LI    CL,X'04'                                                                  00013900
000804 80060000          707         LA    AX,LSASTCK                                                                00014000
000808 D3E8              708         SRL   AX,CL                                                                     00014100
00080A 03C3              709         A     AX,BX                                                                     00014200
                         710 *                             1. SET STACK SEGMENT REGISTER;                            00014300
00080C 8ED0              711         L     SS,AX                                                                     00014400
                         712 *                             1. LOAD STACK POINTER TO BOTTOM OF STACK;                 00014500
00080E 8D060010          713         LA    AX,(=LIBSTSZ)                                                             00014600
000812 200100            714         SI    AX,X'0001'                                                                00014700
000815 8BE0              715         L     SP,AX                                                                     00014800
                         716 *                             1. ADJUST (4 BIT) COMMON ADDRESS SO THAT;                 00014900
                         717 *                             1. YOU CAN NOW;                                           00015000
000817 8D060000          718         LA    AX,LSAPOOL                                                                00015100
00081B D3E8              719         SRL   AX,CL                                                                     00015200
00081D 03C3              720         A     AX,BX                                                                     00015300
                         721 *                             1. SET DS REGISTER TO POINT TO COMMON                     00015400
                         722 *                                STORAGE AREA;                                          00015500
00081F 8ED8              723         L     DS,AX                                                                     00015600
                         724 *                             1. SAVE ORIGINAL CS VALUE;                                00015700
000821 8C0E0400          725         ST    CS,=LSAORCS                                                               00015800
                         726 *                             1. SET ES REGISTER TO POINT TO MAIN                       00015900
                         727 *                                DICTIONARY;                                            00016000
000825 8D060000          728         LA    AX,JDLDA                                                                  00016100
000829 D3E8              729         SRL   AX,CL                                                                     00016200
00082B 03C3              730         A     AX,BX                                                                     00016300
00082D 8EC0              731         L     ES,AX                                                                     00016400
                         732 *                             1. AS WELL AS STORING ADDRESS IN COMMON                   00016500
                         733 *                                AREA;                                                  00016600
00082F A32003            734         ST    AX,JSCIDICT                                                               00016700
                         735 *                             1. STORE SUPPLEMENTAL DICTIONARY ADDRESS                  00016800
                         736 *                                IN COMMON AREA;                                        00016900
000832 8D060000          737         LA    AX,JDLSA                                                                  00017000
000836 D3E8              738         SRL   AX,CL                                                                     00017100
000838 03C3              739         A     AX,BX                                                                     00017200
00083A A32203            740         ST    AX,JSCISUPL                                                               00017300
                         741 *                             1. EMULATE DISPLAYWRITER ENVIRONMENT BY                   00017400
                         742 *                                SETTING MIN WORD LENGTH FOR STEM                       00017500
                         743 *                                PROCESSING AND BY CLEARING TEXT                        00017600
                         744 *                                EDITOR FLAGS;                                          00017700
00083D C606760303        745         MVIB  JSCIMINW,X'03'                                                            00017800
000842 C606800300        746         MVIB  JSCITEF2,X'00'                                                            00017900
                         747 *                             1. INITIALIZE MULTIBUS BOARDS OR PC HDWR;                 00018000
000847 E80000            748         CALL  LINITMB                                                                   00018100
                         749 *                             1. WHILE QUIT FLAG NOT SET,                               00018200
                         750 *                             1. DO                                                     00018300
                         751 *1      WHILE (IB,=LSBDUMM,EQ,X'00'),DO                                                 00018400
00084A E99300            752         J     L0000001                                                                  00018500
                         753 L0000002 EQU  *                                                                         00018600
                         754 *                             2. . READ OPTIONS SWITCHES;                               00018700
                         755         LROOP                                                                           00018800
```

```
000840 8026070080   756*         NIB    #LIBOPT,#LIMPROP   SAVE ONLY POR-ONLY OPTIONS
000852 F606030001   757*         TIB    #LSOPCOP,#LSMPCSW
000857 7504         758*         JNZ    $PC00002
000859 E48A         759*         INB    #LIAOPT
00085B EB06         760*         J      $MSK0002
00085D 52           761*$PC00002 PUSH   DX
00085E BA4202       762*         LI     DX,#LIAOPT
000861 EC           763*         INB    DX
000862 5A           764*         POP    DX
000863 247F         765*$MSK0002 NI     AL,#LIMPRON    MASK OFF SWITCHES VALID AT POR ONLY
000865 08060700     766*         O      #LIBOPT,AL     SAVE BOTH POR AND NON-POR OPTIONS
                    767 *                          2. . GET DELIMITED TEXT STRING;
000869 E80000       768          CALL   LFNDWRD
                    769 *                          2. . READ OPTIONS AGAIN;
                    770          LROOP
00086C 8026070080   771*         NIB    #LIBOPT,#LIMPROP   SAVE ONLY POR-ONLY OPTIONS
000871 F606030001   772*         TIB    #LSBFCOP,#LSMPCSW
000876 7504         773*         JNZ    $PC00003
000878 E48A         774*         INB    #LIAOPT
00087A EB06         775*         J      $MSK0003
00087C 52           776*$PC00003 PUSH   DX
00087D BA4202       777*         LI     DX,#LIAOPT
000880 EC           778*         INB    DX
000881 5A           779*         POP    DX
000882 247F         780*$MSK0003 NI     AL,#LIMPRON    MASK OFF SWITCHES VALID AT POR ONLY
000884 08060700     781*         O      #LIBOPT,AL     SAVE BOTH POR AND NON-POR OPTIONS
                    782 *                          2. . IF EITHER SUPPLEMENTAL UPDATE OPTION
                    783 *                               IS ON AND LAST WORD WAS NOT FOUND,
                    784 *$       IF  (((IB,#LIDOPT,<#LIMCJUS>,IS,ON),OR
000888 F606070080   785          TIB    #LIBOPT,#LIMCJUS
00088D 7507         786          JNZ    L0000003
                    787 *$       IF  (IB,#LIDOPT,<#LIMUPSU>,IS,ON)),AND
00088F F606070001   788          TIB    #LIBOPT,#LIMUPSU
000894 7439         789          JZ     L0000004
                    790 L0000003 EQU    *
                    791 *$       IF  (IB,#LIDERR,<#LIMNOTF>,IS,ON),THEN
000896 F606060004   792          TIB    #LIDERR,#LIMNOTF
00089B 7432         793          JZ     L0000004
                    794 *                          2. . THEN.
                    795 *                          3. . . POINT TO LAST WORD (WHICH WAS NOT
                    796 *                                  FOUND);
00089D 8D362E03     797          LA     SI,JSCISPIO
                    798 *                          3. . . AND ADD IT TO SUPPLEMENTAL
                    799 *                                  DICTIONARY;
0008A1 9A00000000   800          CALLF  JSSWDADD
                    801 *                          3. . . IF SUPPLEMENTAL UPDATE FAILED
                    802 *                                  BECAUSE SUPPLEMENTAL WAS FULL.
                    803 *$       IF (IB,JSCISSFL,<JSCISSNG>,IS,ON),THEN
0008A6 F6062A0320   804          TIB    JSCISSFL,JSCISSNG
0008AB 7422         805          JZ     L0000005
                    806 *                          3. . . THEN
                    807 *                          4. . . . TURN ON SUPPLEMENTAL FULL
                    808 *                                    INDICATOR;
0008AD 800E060010   809          OIB    #LIBERR,#LIMSUPF
0008B2 A00600       810          L      AL,#LIBERR
                    811          LWRER
0008B5 0C40         812*         OI     AL,#LIMSTRB
0008B7 F606030001   813*         TIB    #LSOPCOP,#LSMPCSW
0008BC 7508         814*         JNZ    $PCE0004
0008BE E6B9         815*         OUTB   #LIAERR
0008C0 24BF         816*         NI     AL,X'FF'-#LIMSTRB
0008C2 E6B9         817*         OUTB   #LIAERR
0008C4 EB09         818*         J      $EN0004
0008C6 52           819*$PCE0004 PUSH   DX
0008C7 BA4102       820*         LI     DX,#LIAPERR
0008CA EE           821*         OUTB   DX
0008CB 24BF         822*         NI     AL,X'FF'-#LIMSTRB
0008CD EE           823*         OUTB   DX
0008CE 5A           824*         POP    DX
                    825*$EN0004  EQU    *
                    826 *                          3. . . ENDIF;
                    827 *$       ENDIF
                    828 L0000005 EQU    *
                    829 *                          2. . ENDIF;
                    830 *$       ENDIF
                    831 L0000004 EQU    *
                    832 *                          2. . MAKE A CALL TO LJSPCNTL TO DO THE
                    833 *                                . FOLLOWING:;
                    834 *                          2. . REMOVE SUFFIXES AND PREFIXES;
                    835 *                          2. . VECTORIZE ROOT;
                    836 *                          2. . LOOK UP ROOT IN MAIN DICTIONARY;
                    837 *                          2. . IF FOUND IN MAIN,
                    838 *                          2. . THEN
                    839 *                          3. . . SIGNAL OK FROM MAIN;
                    840 *                          2. . ELSE
                    841 *                          3. . . TRY SUPPLEMENTAL DICTIONARY;
                    842 *                          3. . . IF FOUND IN SUPPLEMENTAL,
                    843 *                          3. . . THEN
                    844 *                          4. . . . SIGNAL OK FROM SUPPLEMENTAL;
                    845 *                          3. . . ENDIF;
                    846 *                          2. . ENDIF;
```

```
                                                                                                              00028100
0005CF 8D365C00      847           LA    SI,#LFACBUF                                                         00028200
000803 E80000        848           CALL  LJSPCNTL                                                            00028300
                     849 *                           2. . IF NOT FOUND IN EITHER DICTIONARY,                 00028400
                     850 *                           2. . THEN                                               00028500
                     851 *$        IF (IW.JSCIRTN.EQ.X'0000'),THEN                                           00028600
000806 833E280300    852           CIW   JSCIRTN,X'0000'                                                     00028700
00080B 7503          853           JNE   L0000006                                                            00028800
                     854 *                           3. . . SIGNAL ERROR TO OPERATOR;                        00028900
0008DD E80000        855           CALL  LERROR                                                              00029000
                     856 *                           2. . ENDIF;                                             00029100
                     857 *$        ENDIF                                                                     00029200
                     858 L0000006 EQU    *                                                                   00029300
                     859 *                           1. ENDWHILE;                                            00029400
                     860 *$        ENDDO                                                                     00029500
                     861 L0000001 EQU    *                                                                   00029600
0008E0 803E000000    862           CIB   #LSBDUMM,X'00'                                                      00029700
0008E5 7503E963FF    863           JE    L0000002                                                            00029800
                     864 *                           ENDSEGMENT (SPELL MAIN);
                     865           END

LOC   OBJECT CODE    STMT SOURCE STATEMENT                                                                00000200

2 *                           BEGINSEGMENT (FIND WORD)                                  00000300
                     3 *                           1. TEXT                                                   00000400
                     4 ***************-START-OF-SPECIFICATIONS-*******************                           00000500
                     5 *                                                                                     00000600
                     6 * PROGRAM NAME: LFNDWRD                                                               00000700
                     7 *                                                                                     00000800
                     8 * DESCRIPTIVE NAME: FIND WORD ROUTINE                                                 00000900
                     9 *                                                                                     00001000
                    10 * FUNCTION: ADD CHARACTERS TO TEXT BUFFERAS THEY ARE RECEIVED AND                     00001100
                    11 *   SIGNAL WHEN A WORK DELIMITER HAS BEEN RECEIVED.                                   00001200
                    12 *                                                                                     00001300
                    13 ***************-END-OF-SPECIFICATIONS-*********************                           00001400
                    14 *                           1. ENDTEXT;                                               00001500
                    16 *                           1. DEFINE                                                 00001600
                    17 LFHALPH EQU    X'00'       VALID ALPHA FLAG (HIGH ORDER BYTE)                         00001700
                    18 LFHMIN1 EQU    X'FF'       HEX MINUS ONE                                              00001800
                    19           PRINT NOGEN                                                                 00001900
                    20           JSCIPOOL                                                                    00002000
000000              21 JSCIPOOL DSECT                                                                        00002100
                    117+         PRINT OFF                                                                   00002200
                    685+         PRINT ON                                                                    00002300
                    687          PRINT GEN                                                                   00002400
                    688 *                           1. ENDDEFINE;                                            00002500
                    689 *                           1. DECLARE                                               00002600
                    690          EXTRN LGETCHAR                                                              00002700
                    691 *                           1. ENDDECLARE;                                           00002800
                    693 *                           1. ENTER FNDWRD;                                         00002900
000000              694 LFNDWRD CSECT                                                                        00003000
                    695 LFNDWRD BSAIDENT                                                                     00003100
000000 E80A         696+         J     L0002         SKIP OVER IDENTIFICATION FIELDS                         00003200
000002 D3C6D5C4E6D9C44 697+      DC    CL8'LFNDWRD'  CSECT NAME                                              00003300
00000A 2173         698+         DC    X'2173'       DATE (JULIAN) OF ASSEMBLY                               00003400
                    699+L0002 EQU     *                                                                      00003500
                    700          USING LFNDWRD,.CS                                                           00003600
                    701          USING JSCIPOOL,.DS                                                          00003700
                    702 *                           1. CLEAR RETURN CODE TO SHOW NO WORD                     00003800
                    703 *                              ENDING FOUND;                                         00003900
00000C 32C0         704          X     AL,AL                                                                 00004000
00000E A23000       705          ST    AL,#LFBRETC                                                           00004100
                    706.*                           1. INITIALIZE BUFFER COUNT TO ZERO;                      00004200
000011 A25C00       707          ST    AL,#LFBCCNT                                                           00004300
                    708 *                           1. REPEAT                                                00004400
                    709 *$       UNTIL (IB,#LFBRETC,NE,X'00'),DO                                             00004500
                    710 L0000001 EQU    *                                                                    00004600
                    711 *                           2. . GET NEXT CHARACTER;                                 00004700
000014 E80000       712          CALL  LGETCHAR                                                              00004800
                    713 *                           2. . TRANSLATE TO INTERNAL CODE;                         00004900
000017 57           714          PUSH  DI                                                                    00005000
000018 8BF8         715          L     DI,AX                                                                 00005100
00001A D1E7         716          SLL   DI,1                                                                  00005200
00001C 8D1E9E00     717          LA    BX,#LFTXLAT                                                           000053C0
000020 8D09         718          L     CX,0(DI,BX,DS)                                                        00005400
000022 5F           719          POP   DI                                                                    00005500
000023 890E9C00     720          ST    CX,#LFWICOD   STORE INTERNAL CODE                                     00005600
                    721 *                           2. . IF VALID ALPHA,                                     00005700
                    722 *                           2. . THEN                                                00005800
                    723 *$       IF (IB,CL,LE,#LFHUPCA),THEN                                                 00005900
000027 80F901       724          CI    CL,#LFHUPCA                                                           00006000

00002A 7F2A         725          JP    L0000002                                                              00006100
                    726 *                           3. . . IF CORRECTING BACKSPACE,                          00006200
                    727 *$       IF (IB,CH,EQ,#LFHCORR),THEN                                                 00006300
00002C 80FD1C       728          CI    CH,#LFHCORR                                                           00006400
00002F 7511         729          JNE   L0000003                                                              00006500
                    730 *                           3. . . THEN                                              00006600
                    731 *                           4. . . . IF BUFFER CHARACTER COUNT GT                    00006700
                    732 *                                     ZERO,                                          00006800
                    733 *$       IF (IB,#LFBCCNT,GT,X'00'),THEN                                              00006900
000031 803E5C0000   734          CIB   #LFBCCNT,X'00'                                                        00007000
000036 7E08         735          JNP   L0000004                                                              00007100
                    736 *                           4. . . . THEN                                            00007200
                    737 *                           5. . . . . DECREMENT BUFFER CHARACTER                    00007300
                    738 *                                       COUNT BY ONE;                                00007400
                                                                                                             00007500-
000038 A05C00       739          L     AL,#LFBCCNT                                                           00007600
00003B 04FF         740          AI    AL,LFHMIN1                                                            00007700
00003D A25C00       741          ST    AL,#LFBCCNT
```

```
                             742 *                                    4. . . . ENDIF;                              00007800
                             743 *$        ENDIF                                                                    00007900
                             744 L0000004 EQU    *                                                                  00008000
                             745 *                                    3. . . ELSE                                  00008100
                             746 *$        ELSE                                                                     00008200
000040 EB12                  747           J      L0000005                                                          00008300

748 L0000003 EQU    *                                                                  00008400
                             749 *                                    4. . . . INCREMENT BUFFER CHARACTER COUNT;   00008500
000042 FE065C00              750           INCB   #LFBCCNT                                                          00008600
                             751 *                                    4. . . . TRANSFER CHARACTER TO BUFFER;       00008700
                                                                                                                    00008800
000046 57                    752           PUSH   DI                                                                00008900
000047 803E5C00              753           LA     DI,#LFTCBUF                                                       00009000
00004B 32FF                  754           X      BH,BH                                                             00009100
00004D 8A1E5C00              755           L      BL,#LFBCCNT                                                       00009200
000051 8829                  756           ST     CH,0(DI,BX,DS)                                                    00009300
000053 5F                    757           POP    DI                                                                00009400
                             758 *                                    3. . . ENDIF;                                00009500
                             759 *$        ENDIF                                                                    00009600
                             760 L0000005 EQU    *                                                                  00009700
                             761 *                                    2. . ELSE                                    00009800
                             762 *$        ELSE                                                                     00009900
000054 EB4C                  763           J      L0000006                                                          00010000
                             764 L0000002 EQU    *                                                                  00010100
                             765 *                                    3. . . IF APOSTROPHE,                        00010200
                             766 *$        IF     (IB,CH,EQ,#LFHAPOS),THEN                                         00010300
000056 80F01B                767           CI     CH,#LFHAPOS                                                      00010400
000059 751B                  768           JNE    L0000007                                                          00010500
                             769 *                                    3. . . THEN                                  00010600
                             770 *                                    4. . . . IF BUFFER CHARACTER COUNT GT        00010700
                             771 *                                                 ZERO,                           00010800
                             772 *$        IF     (IB,#LFBCCNT,GT,X'00'),THEN                                      00010900
00005B 803E5C0000            773           CIB    #LFBCCNT,X'00'                                                   00011000
000060 7E14                  774           JNP    L0000008                                                          00011100
                             775 *                                    4. . . . THEN                                00011200
                             776 *                                    5. . . . . INCREMENT BUFFER CHARACTER        00011300
                             777 *                                                 COUNT;                          00011400
000062 FE065C00              778           INCB   #LFBCCNT                                                          00011500
                             779 *                                    5. . . . . TRANSFER CHARACTER TO BUFFER;     00011600
                                                                                                                    00011700
000066 57                    780           PUSH   DI                                                                00011800
000067 803E5C00              781           LA     DI,#LFTCBUF                                                       00011900
00006B 32FF                  782           X      BH,BH                                                             00012000
00006D 8A1E5C00              783           L      BL,#LFBCCNT                                                       00012100
000071 8829                  784           ST     CH,0(DI,BX,DS)                                                    00012200
000073 5F                    785           POP    DI                                                                00012300
                             786 *                                    5. . . . . CLEAR WORD ENDING BIT SO          00012400
                             787 *                                                 EMBEDDED APOSTROPHE DOES NOT    00012500
                             788 *                                                 FLUSH BUFFER;                    00012600
000074 32C9                  789           X      CL,CL                                                             00012700
                             790 *                                    4. . . . ENDIF;                              00012800
                             791 *$        ENDIF                                                                    00012900
                             792 L0000008 EQU    *                                                                  00013000
                             793 *                                    3. . . ENDIF;                                00013100
                             794 *$        ENDIF                                                                    00013200
                             795 L0000007 EQU    *                                                                  00013300
                             796 *                                    3. . . IF NUMERIC,                           00013400
                             797 *                                    3. . . THEN                                  00013500
                             798 *$        IF     (IB,CH,EQ,#LFHNUM),THEN                                          00013600
000076 80F020                799           CI     CH,#LFHNUM                                                        00013700
000079 750C                  800           JNE    L0000009                                                          00013800
                             801 *                                    4. . . . IF BUFFER CHARACTER COUNT GT        00013900
                             802 *                                                 ZERO,                           00014000
                             803 *                                    4. . . . THEN                                00014100
                             804 *$        IF     (IB,#LFBCCNT,GT,X'00'),THEN                                      00014200
00007B 803E5C0000            805           CIB    #LFBCCNT,X'00'                                                   00014300
000080 7E05                  806           JNP    L0000010                                                          00014400
                             807 *                                    5. . . . . FLUSH BUFFER;                     00014500
000082 32C0                  808           X      AL,AL                                                             00014600
000084 A25C00                809           ST     AL,#LFBCCNT                                                       00014700
                             810 *                                    4. . . . ENDIF;                              00014800
                             811 *$        ENDIF                                                                    00014900
                             812 L0000010 EQU    *                                                                  00015000
                             813 *                                    3. . . ENDIF;                                00015100
                             814 *$        ENDIF                                                                    00015200
                             815 L0000009 EQU    *                                                                  00015300
                             816 *                                    3. . . IF (CODE J),                          00015400
                             817 *                                    3. . . THEN                                  00015500
                             818 *$        IF     (IB,CH,EQ,#LFHUPSL),THEN                                         00015600
000087 80FD1D                819           CI     CH,#LFHUPSL                                                      00015700
00008A 7505                  820           JNE    L0000011                                                          00015800
                             821 *                                    4. . . . SET CODE J SUPPLEMENTAL UPDATE      00015900
                             822 *                                                 FLAG;                           00016000
00008C 800E070080            823           OIB    #LIBOPT,#LIMCJUS                                                  00016100
                             824 *                                    3. . . ENDIF;                                00016200
                             825 *$        ENDIF                                                                    00016300
                             826 L0000011 EQU    *                                                                  00016400
                             827 *                                    3. . . IF WORD ENDING BIT IS ON,             00016500
                             828 *                                    3. . . THEN                                  00016600
                             829 *$        IF     (IB,CL,GE,#LFHWDLM),THEN                                         00016700
000091 80F940                830           CI     CL,#LFHWDLM                                                      00016800
000094 7C0C                  831           JM     L0000012                                                          00016900
                             832 *                                    4. . . . IF BUFFER CHARACTER COUNT IS GT     00017000
                             833 *                                                 ZERO,                           00017100
                             834 *$        IF     (IB,#LFDCCNT,GT,X'00'),THEN                                      00017200
000096 803E5C0000            835           CIB    #LFBCCNT,X'00'                                                   00017300
00009B 7E05                  836           JNP    L0000013                                                          00017400
                             837 *                                    4. . . . THEN                                00017500
                             838 *                                    5. . . . . SET RETURN CODE TO INDICATE       00017600
                             839 *                                                 TEXT STRING IS IN THE BUFFER    00017700
                             840 *                                                 AND NEEDS TO BE VERIFIED;       00017800
00009D C606300001            841           MVIB   #LFBRETC,X'01'                                                   00017900
                             842 *                                    4. . . . ENDIF;                              00018000
                             843 *$        ENDIF                                                                    00018100
                             844 L0000013 EQU    *                                                                  00018200
                             845 *                                    3. . . ENDIF;                                00018300
                             846 *$        ENDIF                                                                    00018400
                             847 L0000012 EQU    *                                                                  00018500
                             848 *                                    2. . ENDIF;                                  00018600
                             849 *$        ENDIF                                                                    00018700
                             850 L0000006 EQU    *                                                                  00018800
                             851 *                                    1. UNTIL RETURN CODE INDICATES WORD ENDING   00018900
```

We claim:

1. A spelling check method for checking the accuracy of the spelling of operator selected words entered in a text string of words through a keyboard of a text processing apparatus comprising the steps of:
providing a string of data signals representing characters forming each operator selected word in a series of complete words;
providing a delimiter data signal to end said string of data signals to define each complete operator selected word;
providing a stored dictionary of data codes representing a first group of preselected and not changeable words;
providing memory means for storing groups of data codes representing a second group of words selected by an operator and not within said first group of words;
comparing said string of data signals with said groups of data codes representing said first group of words to determine the existence of a match with any of said first group of words and with any groups of data codes stored in said memory means to determine the existence of a match with any of said groups of data codes representing said second group of words immediately upon the receipt of said delimiter data signal from said keyboard;
alerting an operator to a condition of no match prior to the comparing of the next complete word, if no match exists in said first or second group of words upon determination of a no match;
storing said string of data signals representing the unmatched complete word in said memory means, in response to receipt of at least an operator supplied data signal indicating acceptance of the spelling of said unmatched complete word;
arranging the words in said memory means in an order from the most recently matched or accepted word to the leastmost recently matched word;
and removing from said memory means a string of data signals representing the leastmost recently matched word in said memory means, when said memory means is incapable of accepting said unmatched complete word, due to said memory means being filled to capacity, upon operator acceptance of said unmatched complete word prior to storing said string of data signals representing said unmatched complete word.

2. The method of claim 1 wherein said operator supplied data signal comprises a word delimiter code following the next subsequent delimited word following said unmatched word.

3. The method of claim 2 wherein said word delimiter code comprises a space code.

4. A spelling check method for checking the accuracy of the spelling of operator selected words entered in a text string of words through a keyboard of a typewriter having as a display only the images formed on the printed page comprising steps of:
providing a string of data signals representing characters forming each operator selected word in a series of complete words;
data signals to define each complete operator seproviding a delimiter data signal to end said string of lected word:
providing a stored library of data codes representing a first group of preselected and not changeable words;
providing memory means for storing groups of data codes representing a second group of words selected by an operator and not in said first group of words; comparing said string of data signals with said groups of data codes representing said first group of words to determine the existence of a match with any of said first group of words immediately upon the receipt of said delimiter data signal from said keyboard and with any groups of data codes stored in said memory means to determine the existence of a match with any of said groups of data codes representing said second group of words;
alerting an operator to a condition of no match prior to the comparing of the next complete word if no match exists in said first or second group of words upon determination of a no match;
storing said string of data signals, representing the unmatched complete word, in said memory means, upon receipt of an operator supplied data signal indicating acceptance of the spelling of said unmatched complete word;
arranging the words in said memory means in an order from the most recently matched or accepted word to the leastmost recently matched or accepted word;
and removing from said memory means a string of data signals representing the least most recently matched word stored in said memory means when said memory means is incapable of accepting said unmatched complete word due to said memory means being filled to capacity, upon operator acceptance, prior to storing said string of data signals representing said unmatched complete word.

5. The method of claim 4 wherein said data strings representing words in said memory are searched in the sequence of the most recently matched to the leastmost recently matched.

6. A typewriter comprising a spelling verification means for comparing previously selected words with entered words typed on said typewriter comprising:
means for accumulating entered codes representing said entered words;
means for delimiting said codes to terminate said words;
means for comparing said entered words with said previously selected words, on an interactive basis as said entered words are entered into said typewriter, to determine if a match or no match condition exists for each of said entered words and for providing an indication of any no-match condition;
means for altering said operator of a no match condition as soon as said means for comparing determines a no match condition after receipt of a delimiter from said keyboard as said entered words are typed on said keyboard, said means for altering being responsive to said means for comparing;
means for storing codes representing operator selected words for comparison with said entered words, said means for storing being accessible by said means for comparing;

means for controlling said means for storing to cause said means for storing to accept an entered word, said means for controlling responsive to an operator controlled signal;

means for ordering access of said codes in said means for storing, such that said means for comparing, upon accessing the contents of said means for storing, will compare said entered words with said operator selected words in the sequence of the most recently matched or operator selected word therein to the leastmost recently matched or operator selected word therein;

and means for removing said leastmost recently matched or operator selected word when said means for storing codes is incapable of accepting additional operator selected words due to said means for storing being filled to capacity.

7. A typewriter comprising a spelling verification means for comparing previously selected words with entered words typed on said typewriter comprising:

means for accumulating entered codes representing said entered words typed on said typewriter;

means for comparing said entered codes upon the assembly and receipt of a delimited character string as the characters are keyed from the keyboard, with codes previously selected and stored for comparison on an interactive basis, as said entered codes are entered into said typewriter, and if identity does not exist, the immediate alerting of the operator as to such condition, means for alerting an operator of said typewriter to a condition of lack of identity between said entered word and said words previously selected and stored, as soon as said means for comparing determines said condition of lack of identity, as said entered words are typed on said typewriter, means to store said entered codes representing each word typed until such time as at least one subsequent delimited word has been typed on said typewriter, and memory means for storing said entered words for which identity does not exist, said memory means receiving said entered codes from said means to store upon the keying of an operator controlled signal, and for including said stored words in code form with said codes previously selected and stored for comparison, as correctly spelled words.

8. The typewriter of claim 7 wherein said means to store said codes comprises a storage for plural words until a line ending command has been typed.

9. The typewriter of claim 7 for typing words onto a record sheet in lines of typing, comprising indicator means for indicating the occurrence of a lack of identity condition within a particular line of typing.

10. The typewriter of claim 7 comprising means for storing in said memory means said entered codes in a predetermined sequence.

11. A text processing apparatus having spelling verification means for interactively comparing each complete word typed on said apparatus with previously selected words including:

first storage means for storing groups of data codes representing a first group of preselected and not changeable words;

second storage means for receiving and storing groups of data codes representing a second group of words selected by an operator during use and not in said first group of words;

producing means for producing a string of data codes representing each complete word typed on said text processing apparatus upon completion of the inputting of the word;

comparing means for comparing said string of data codes representing each complete word immediately after it is typed with said codes representing said first group of words in said first storage means and said second group of codes representing said second group of words in said second storage means;

alerting means for alerting an operator if no match exists between each complete word and said first group of words and said second group of words and prior to the comparing of the next complete word by said comparing means;

and means for storing the data signals representing the unmatched complete word in said second storage means in response to a signal produced after said alerting means is activated.

12. The text processing apparatus according to claim 11 including means for arranging the locations of the groups of data codes stored in said second storage means so that the leastmost recently matched word in said second storage means is removed when said second storage means is incapable of accepting the most recent unmatched complete word.

13. The text processing apparatus according to claim 12 including means for shifting the location of a word in said second storage means when it is matched with the complete word by said comparing means.

14. The text processing apparatus of claim 11 including removing means for removing the leastmost recently matched word in said second storage means when said second storage means is incapable of accepting the most recent unmatched complete word.

15. A method for interactively verifying the spelling of each complete word typed on a typewriter by an operator with previously selected word including:

producing a string of data signals representing each complete word;

comparing the string of data signals with a first group of data codes stored in a first storage means and representing a first group of words, the first group of data codes being preselected and not changeable and, with any second group of data codes stored in a second storage means and representing a second group of words that are selected by an operator of the typewriter and are not in the first group of words in the first storage means, said comparing beginning immediately upon completion of said word;

alerting the operator of the typewriter when the complete word does not match any word in the first group of words in the first storage means or any word in the second group of words in the second storage means and prior to the comparing of the next complete word;

and storing the string of data signals in the second storage means upon generation of a signal after the operator is alerted.

16. The method according to claim 15 including arranging the location of each word in the second storage means so that the leastmost recently matched word in the second storage means is removed when the second storage means is incapable of accepting the most recent unmatched complete word.

17. The method according to claim 16 including shifting the location of a word in the second storage means each time that it is matched with a complete word during comparison of each complete word.

18. The method according to claim 15 including removing the leastmost recently matched word in the second storage means when the second storage means is incapable of accepting the most recent unmatched complete word.

19. A spelling check method comprising the steps of:
providing a string of data signals representing characters forming a word;
providing a stored library of selected groups of data codes representing a first group of preselected and not changeable words;
providing a memory for receiving and storing groups of data codes representing a second group of words not within said first group of words and selectively supplied to said memory;
comparing said string of data signals with said groups of data codes representing said first group of words to determine the existence of a match with any of said first group of words, and, comparing said string of data signals with any groups of data codes stored in said memory to determine the existence of a match with any of said groups of data codes representing said second group of words;
alerting an operator to a condition of no match immediately if no match exists in said first or second group of words;
and storing said string of data signals in said memory representing the last complete word only when the last complete word is not in said first or second group of words upon further providing of data signals representing characters forming the next word.

20. The spelling check method of claim 19 wherein said storing said string of data signals in said memory is accomplished upon the providing of a second data signal which ends said words following said complete word.

21. The spelling check method of claim 19 further comprising the steps of:
deleting a group of data codes representing one of said second group of words from said memory;
whereby one of said second group of words is removed from said memory to provide room for said last complete word.

22. The spelling check method of claim 19 wherein said operating an alarm comprises illuminating and optical attention-getting device.

* * * * *